Oct. 25, 1960 G. BRAM 2,957,717
SEALING MEMBERS AND REINFORCEMENTS THEREFOR
Filed March 11, 1958 2 Sheets-Sheet 1
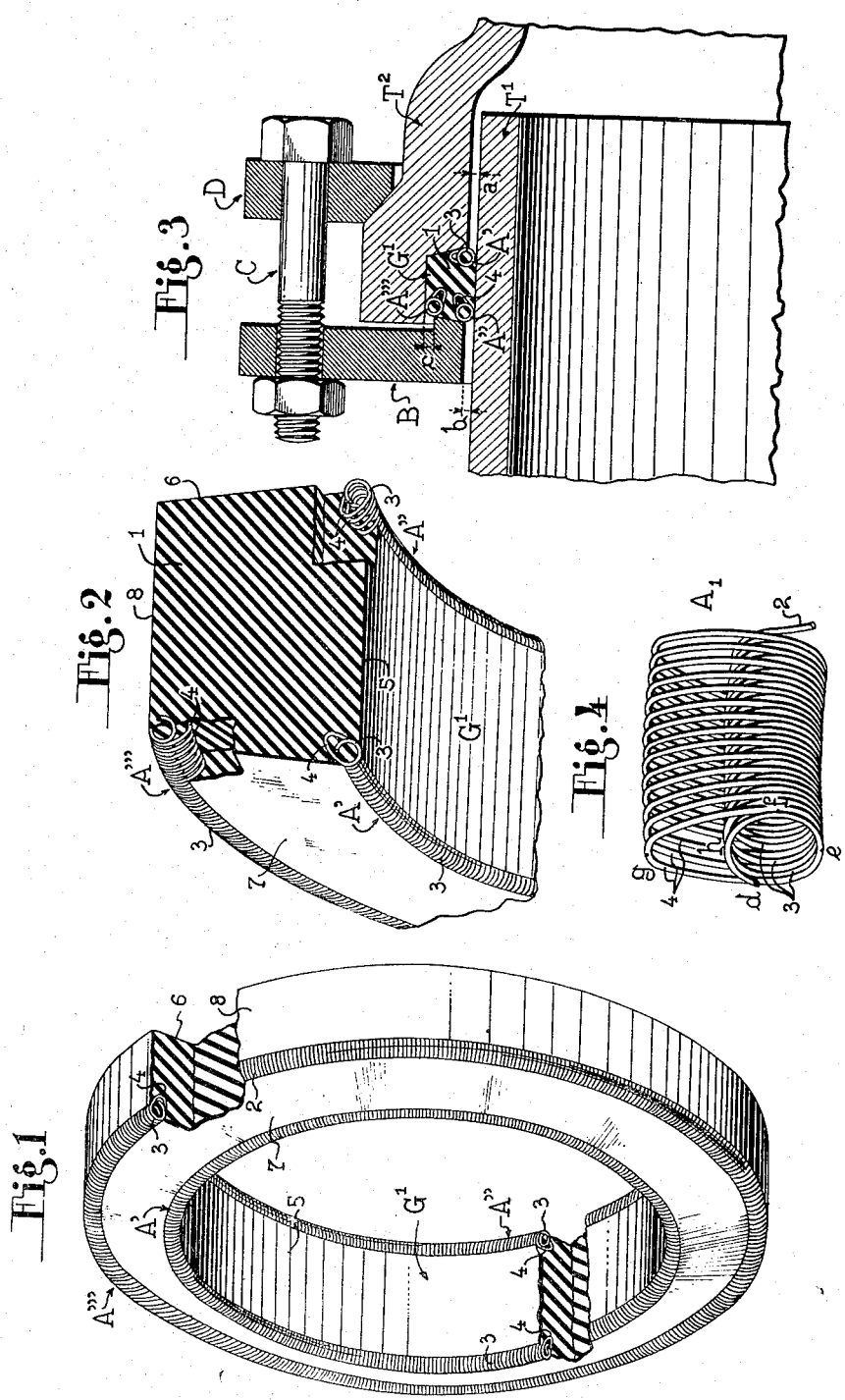

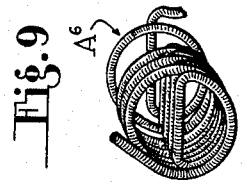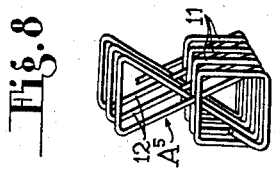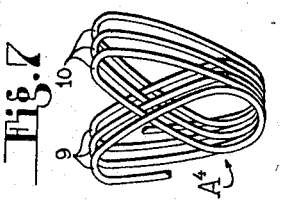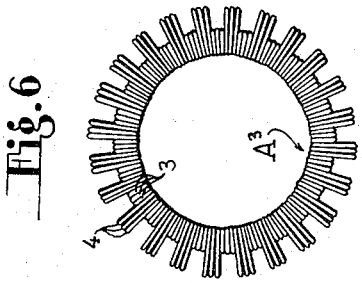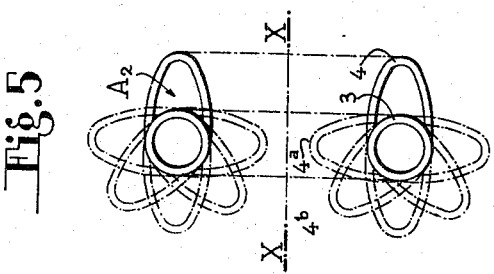

United States Patent Office 2,957,717
Patented Oct. 25, 1960

2,957,717
SEALING MEMBERS AND REINFORCEMENTS THEREFOR

Georges Bram, Pont-a-Mousson, France, assignor to Compagnie de Pont-a-Mousson, Nancy, France, a French body corporate Filed Mar. 11, 1958, Ser. No. 720,585

Claims priority, application France Mar. 13, 1957

8 Claims. (Cl. 288—27)

The present invention relates to sealing members for pipes and like objects having a socket connection and in particular to elastic members for joints of the type in which the sealing member is clamped by an auxiliary annular member in a recess formed between the facing surfaces of the socket-mounted pipes.

It is known that in this type of joint the sealing is the better as the clamping, and in consequence the compression, of the elastic member is greater owing to the fact that the member is in this way closely applied against the surfaces of the assembled pipes.

However, under the effect of the clamping pressure the material of the sealing member has a tendency to flow or creep and extrude through the clearances existing between the assembled elements and the clamping member. This flow, which is manifested by beading-like swellings or protrusions, is the greater as the initial clamping pressure is higher and clearances are greater. As the flow increases the clamping pressure of the sealing member diminishes and the sealing properties of the joint decrease.

Further, the purely mechanical flow or creep of the sealing member could possibly quicken if the fluid transported by the pipes is capable of adversely affecting the material of the sealing member such as by corrosion or the like. This occurs in the case of washers of natural rubber used in gas piping. In the latter case, it has already been proposed to protect part of the rubber washer either with a single-piece annular L-sectioned member, for example of lead, applied after moulding, or with a special synthetic rubber band which resists the action of the gas and is vulcanized with the washer.

The purpose of the present invention is to remedy the aforementioned disadvantages.

An object of the invention is to provide a sealing member capable of resisting flow or creep and characterized in that it comprises at least one reinforcement consisting of adjacent elements flush with the outer face of the member and elastically interconnected in the form of an endless extensible chain anchored in the mass of the material constituting the body of the sealing member.

In one form of the invention, the reinforcement consists of a metal wire wound in the form of adjacent coils which have periodically varying shapes, each coil having a portion which has such shape as to be superposable on the corresponding portion of the other coils, the wound wire constituting a closed ring, and said superposable portions constituting said adjacent elements and the rest of the coils constituting extensible connections between said elements.

A further object of the invention is to provide a reinforcement adapted to reinforce said sealing member, said reinforcement consisting of an endless extensible chain of elastically interconnected, adjacent, rigid elements, said chain having anchoring portions offset relative to said elements.

Further features and advantages of the invention will be apparent from the ensuing description, with reference to the accompanying drawings, to which the invention is in no way limited.

In the drawings:

Fig. 1 is a perspective view with parts cut away of a sealing member embodying the invention;

Fig. 2 is a partial cross-sectional view on an enlarged scale of the member shown in Fig. 1;

Fig. 3 is a partial axial sectional view of a joint or coupling between two pipes incorporating said sealing member;

Fig. 4 is a perspective view on an enlarged scale of a portion of one of the reinforcements of said sealing member;

Fig. 5 is a radial sectional view on a small scale of a first modification of the reinforcement;

Fig. 6 is a complete side view on a small scale of another modification of the reinforcement;

Figs. 7, 8 and 9 are perspective views on an enlarged scale of portions of other reinforcement modifications.

In the embodiment shown in Figs. 1 to 3, the sealing member $C_1$ comprises three reinforcing members or reinforcements A', A", A''', described hereinafter, is annular and is adapted to be clamped or gripped (Fig. 3) between the male end or spigot of a pipe $T_1$ and the recess of the socket or bell of a pipe $T_2$ so as to provide a seal between these two pipes. The clamping is effected in the usual manner by means of an annular member and bolts C which bear against a flange formed on the pipe $T_2$ through the medium of another annular member D. Clearances are provided at $a$ between the pipes $T_1$ and $T_2$ and at $b$ and $c$ between each of these pipes and the member D. With a conventional joint washer or ring, creep or flow is observed in the clearances $a$, $b$ and $c$ in the form of beading-like swellings.

This disadvantage is avoided with the sealing member $G_1$ embodying the invention which is reinforced by the reinforcements A', A" and A''' disposed along its periphery in the corners of its profile and anchored in the course of molding in the mass of the material constituting the body 1 of the sealing member, which is usually rubber.

Each reinforcement is of the type $A_1$ shown in Fig. 4. It consists of a metal or metal alloy wire 2 which is preferably rustless and is not capable of being corroded by the fluids flowing through the pipes. In particular, use can be made of a wire which is covered with a layer or film of a plastic material or provided with a plastic sheath so as to avoid any electric contact between the assembled pipes.

The wire 2 is wound into adjacent close coils or whorls which are alternately circular at 3 and elongated, for example oval, at 4. A portion $d$, $e$, $f$ of each of the coils 3 and 4 has such shape as to be superposable on the corresponding portion $d$, $e$, $f$ of the other coils. Said superposable portion of the coils 4 is part-circular and the coils 4 protrude from the coils 3 at their elongated portions $d$, $g$, $f$. Thus there is a free passage for the rubber of the body 1 in the course of moulding inside the coils 3 and between the non-superimposable portions of the coils 3 and 4, whereas in the region of the superimposable portions it is practically impossible for the rubber in the course of moulding to pass from the interior toward the exterior of the coils, or vice versa. The coiled assembly is closed on itself and constitutes an elastically deformable toric ring, the deformation being in the form of flattening or separation of the coils, extension and torsion.

In the embodiment shown in Figs. 1, 2 and 3, the reinforcements A', A" and A''' have their coils 3 disposed in such manner that they are adjacent the clearances $a$, $b$ and $c$ (Fig. 3).

The superimposable portions $d$, $e$, $f$, (Fig. 4) of the coils 3 and 4 are flush with the outer face of the sealing member and form thereon a radiused portion or corner between the inner face 5 and the lateral face 7 in respect of the reinforcement A', between the inner face 5 and the lateral face 6 in respect of the reinforcement A", and between the outer face 8 and the lateral face 7 in respect of the reinforcement A'''.

Owing to the spaces provided between the circular coil portions $d$, $h$, $f$ by the elongated coil portions $d$, $g$, $h$, the rubber, in the course of moulding the sealing member, completely fills the member up to the coil portions $d$, $e$, $f$ so that the portions $d$, $g$, $f$ and $d$, $h$, $f$ are embedded in the mass of rubber, are absolutely rigid with the sealing member after vulcanisation and constitute the anchoring means for the portions $d$, $e$, $f$.

The actual construction of the reinforcement renders it capable of elastically conforming to deformations of the sealing member and in particular to a certain peripheral elongation. Further, the portions $d$, $e$, $f$ constitute a barrier which, in bearing against the faces of the pipes $T_1$ and $T_2$ or the member B forming the housing for the sealing member, prevent the local deformations of the sealing member through the free spaces $a$, $b$, $c$ and in consequence prevent the flow or creep of the sealing member in the form of beading-like swellings. In actual fact the clearances or spaces are not entirely closed by the portions $d$, $e$, $f$ since they do not form a continuous barrier, but it is decreased to a large extent and divided up into very small spaces through which the rubber is substantially prevented from flowing.

As, owing to the presence of the reinforcement of the invention, the rubber of the sealing member is substantially enclosed in the closed space formed, either by the faces of the housing for the sealing member, or by the portions $d$, $e$, $f$ of the reinforcements, this rubber is totally under compression without any surface tension on the outer face of the sealing member. The rubber is therefore substantially protected from outside atmospheric agents or from the fluids in the pipes.

In the embodiment described hereinbefore, the sealing member has a trapezoidal radial axial cross-sectional shape, but it will be understood that this shape is not essential and would naturally depend on the shape of the housing adapted to receive the sealing member.

Figs. 5 to 9 show modifications of reinforcements which can be used with these various types of sealing members.

In the reinforcement $A_2$ shown in Fig. 5, the anchoring coils could be orientated in different directions at 4, $4^a$, $4^b$ relative to the axis XX of the toric ring or parallel with this axis, or perpendicular to the latter toward the interior or exterior, or obliquely toward the interior or exterior.

In the reinforcement shown in Figs. 4 and 5 the periodic variations in the shapes of the coils are short periods since each coil 3 is followed by a coil 4.

In Fig. 6 the reinforcement $A_3$ has longer periods of variation and comprises alternating groups of coils 3 and 4.

The reinforcement $A_4$ shown in Fig. 7 comprises equal coils 9 and 10 deviated or offset alternately to the right and to the left in a direction parallel with the axis of revolution.

The reinforcement $A_5$ shown in Fig. 8 comprises coils 11 and 12 in the form of quadrilaterals which are alternately without any re-entrant angle and crossed.

According to other modifications (not shown in the drawings), the coils of the reinforcements could have other curved or rectilinear shapes in accordance with geometric figures or otherwise, and could be of identical shape and alternately deviated or offset in one direction or the other, or have the same shape but different dimensions or different shapes.

The metal wire constituting the reinforcement could comprise projections, for example it could be knurled or grooved as shown at $A_6$ in Fig. 9 to improve the adherence of the reinforcement to the mass of the material of the sealing member.

Although specific embodiments of the invention have been described, many modifications and changes may be made therein without departing from the scope of the invention as defined in the appended claims.

Having now described my invention what I claim as new and desire to secure by Letters Patent is:

1. Sealing member capable of resisting creep, comprising an annular body of elastic material and at least one reinforcing member comprising a metal wire of substantially uniform transverse configuration wound in the form of adjacent coils, the shapes of the coils periodically varying but each coil having a portion superposable on the corresponding portions of the other coils, said wound wire forming a closed ring, said superposable portions of the coils being flush with the outer face of the annular body and the rest of the coils constituting extensible connecting means which interconnect said superposable portions in an endless extensible structure anchored in the mass of the elastic material of the annular body.

2. Sealing member as claimed in claim 1, wherein the reinforcing member comprises in alternating relation circular coils flush with the outer face of the body and coils having an elongated shape which are also flush with the body in their portions which are adjacent the circular coils, whereas the remaining portion of each of the elongated coils is anchored within the body.

3. Sealing member as claimed in claim 2, wherein the circular coils alternate with the elongated coils individually.

4. Sealing member as claimed in claim 2, wherein groups of a plurality of circular coils alternate with groups of a plurality of elongated coils.

5. Sealing member as claimed in claim 2, wherein the elongated coils are all disposed at the same angle to the circular coils.

6. Sealing member as claimed in claim 2, wherein the elongated coils are disposed at different angles relative to the circular coils.

7. Sealing member as claimed in claim 1, wherein said metal wire is wound in the form of elongated coils which have alternately one and then another angular position.

8. Sealing member capable of resisting creep comprising an annular body of elastic material and at least one reinforcing member comprising a continuous metal wire of constant transverse section wound in the form of adjacent close coils, the coils being constituted alternately by circular and elongated whorls, each elongated whorl having a portion superposable on corresponding portions of the adjacent circular whorls, said wound wire forming a closed ring, said superposable portions of the whorls being flush with the outer face of the annular body and the rest of the whorls constituting extensible connecting means which interconnect said superposable portions in an endless extensible structure anchored in the mass of the elastic material of the annular body.

References Cited in the file of this patent

UNITED STATES PATENTS

| | | |
|---|---|---|
| 1,984,806 | Pfefferle | Dec. 18, 1934 |
| 2,194,943 | Hubbard | Mar. 26, 1940 |
| 2,325,556 | Taylor et al. | July 27, 1943 |
| 2,721,091 | Pfefferle et al. | Oct. 18, 1955 |